Nov. 15, 1966 J. H. CALVIN 3,285,283

QUICK DISCONNECT COUPLINGS

Filed Feb. 10, 1964 5 Sheets-Sheet 1

INVENTOR.
JOHN H. CALVIN
BY Forrest J. Lilly
ATTORNEY

INVENTOR.
JOHN H. CALVIN
BY Forrest J. Lilly
ATTORNEY

Nov. 15, 1966 J. H. CALVIN 3,285,283

QUICK DISCONNECT COUPLINGS

Filed Feb. 10, 1964 5 Sheets-Sheet 3

INVENTOR.
JOHN H. CALVIN

BY Forrest J. Lilly
ATTORNEY

QUICK DISCONNECT COUPLINGS

Filed Feb. 10, 1964

INVENTOR.
JOHN H. CALVIN
BY Forrest J. Lilly
ATTORNEY

INVENTOR.
JOHN H. CALVIN
BY Forrest J. Lilly
ATTORNEY

United States Patent Office 3,285,283
Patented Nov. 15, 1966

3,285,283
QUICK DISCONNECT COUPLINGS
John H. Calvin, 2919 Nebraska Ave., Montecito, Calif.
Filed Feb. 10, 1964, Ser. No. 343,555
16 Claims. (Cl. 137—614.03)

My copending application Serial No. 23,716, filed April 21, 1960, now Patent No. 3,120,968, and entitled, Quick Disconnect Coupling With Ring Detent, discloses improved quick disconnect couplings of this type. The present application is a continuation-in-part of said copending application and discloses further improvements in quick disconnect couplings.

This invention relates generally to fluid couplings and, more particularly, to improvements in quick disconnect couplings.

Quick disconnect couplings are generally well known in the art. A typical coupling of this type is composed of two coupling parts which may be telescopically assembled. These parts have coacting locking means which interengage when the parts are assembled, thereby to lock the parts against axial separation under the force of fluid pressure in the coupling. Accessible externally of the coupling is a lock release member which may be operated to release the locking means of the coupling and thereby permit axial separation of the coupling parts. One or both parts of the coupling are commonly equipped with a valve which closes when the coupling is disassembled to prevent fluid from escaping through the open passages in the parts. The valves are opened during subsequent re-assembly of the coupling to permit normal fluid flow through the coupling.

A general object of the invention is, therefore, to provide improved quick disconnect couplings.

Another object of the invention is to provide improved quick disconnect couplings wherein the locking means are uniquely constructed to produce a more positive lock between the coupling parts.

Yet another object of the invention is to provide improved quick disconnect couplings wherein the coupling lock release means is uniquely constructed to develop a mechanical advantage which facilitates disassembly of the coupling, particularly in a high pressure system.

A further object of the invention is to provide quick diconnect couplings which are adapted for release by a lanyard.

Yet a further object of the invention is to provide improved quick disconnect couplings which are equipped with valves for sealing the coupling parts against fluid leakage when the couplings are disassembled, and wherein during the assembly of the couplings, the valves remain seated until the coacting locking means on the coupling parts are positively engaged, and during disassembly, the valves seat prior to release of the locking means.

Other objects, advantages and features of the invention will become evident as the description proceeds.

Briefly, these objects are attained by providing quick disconnect couplings wherein the coupling parts are locked against separation by engagement of a radially yieldable locking ring on one part in a locking groove in the other part. When in finally locked position, a locking shoulder on said one coupling part engages the locking ring to positively restrain the latter against yielding out of the locking groove in the other part. To disassemble the coupling, the locking shoulder is first disengaged from the locking ring, to release the latter for yielding radially out of its locking groove. The coupling parts are then separated manually or by the pressure of valve springs and/or fluid pressure in the couplings.

According to a highly important and unique feature of the invention, the locking shoulders of the couplings are disengaged from the locking rings, to permit separation of the coupling parts, by a handle. This handle develops a mechanical advantage which facilitates disassembly of the couplings, particularly in high pressure systems. According to another important feature of the invention, these lock release handles are adapted for remote operation through a lanyard. A third important feature of the invention is concerned with quick disconnect coupling constructions wherein the coupling valves close prior to release of the lock between the coupling parts when the couplings are being disconnected and open after positive locking of the parts together when the couplings are being re-assembled. In this way, the couplings are not subjected to line pressure until their parts are positively locked together. Assembly and disassembly of the couplings is, therefore, made safer and easier.

Certain presently preferred embodiments of the invention will now be described in detail by reference to the attached drawings, wherein.

Figure 1:
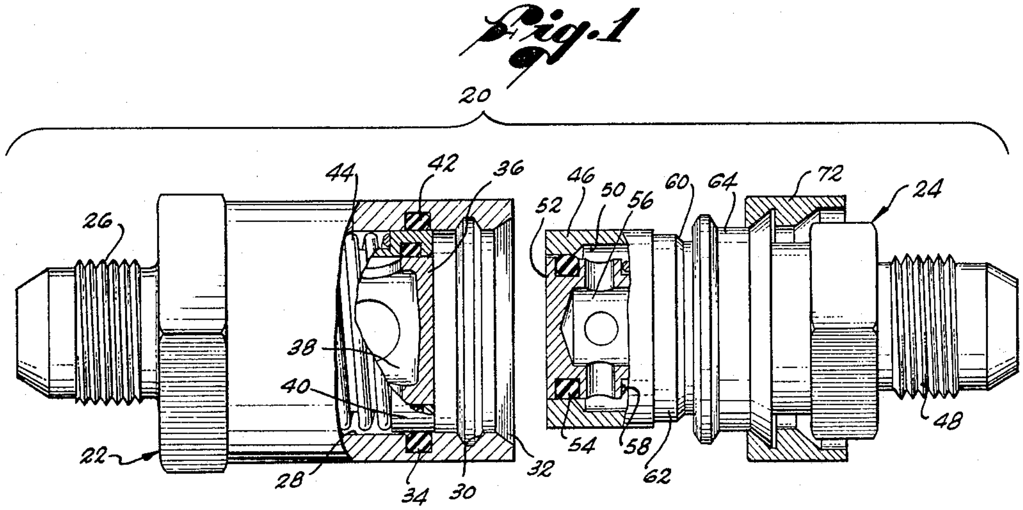
FIG. 1 is a side elevation, partly broken away, of a coupling according to the invention and showing the coupling parts prior to assembly.
Figures 12, 13, 13A:
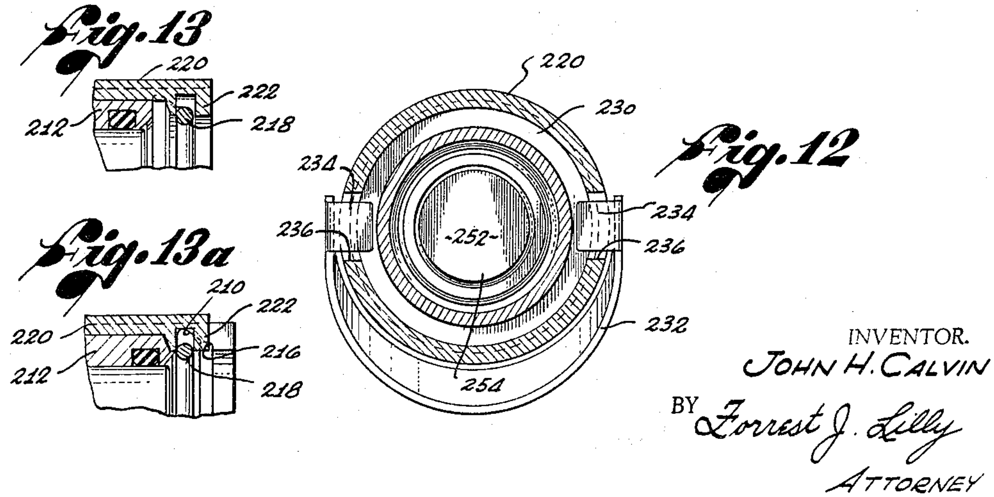
FIG. 12 is a section taken along line 12—12 in FIG. 10.
FIG. 13 is an enlarged detail, in section, of the locking ring on the coupling of FIGS. 9 and 10, showing the ring in its locked position.
Figures 14, 16:
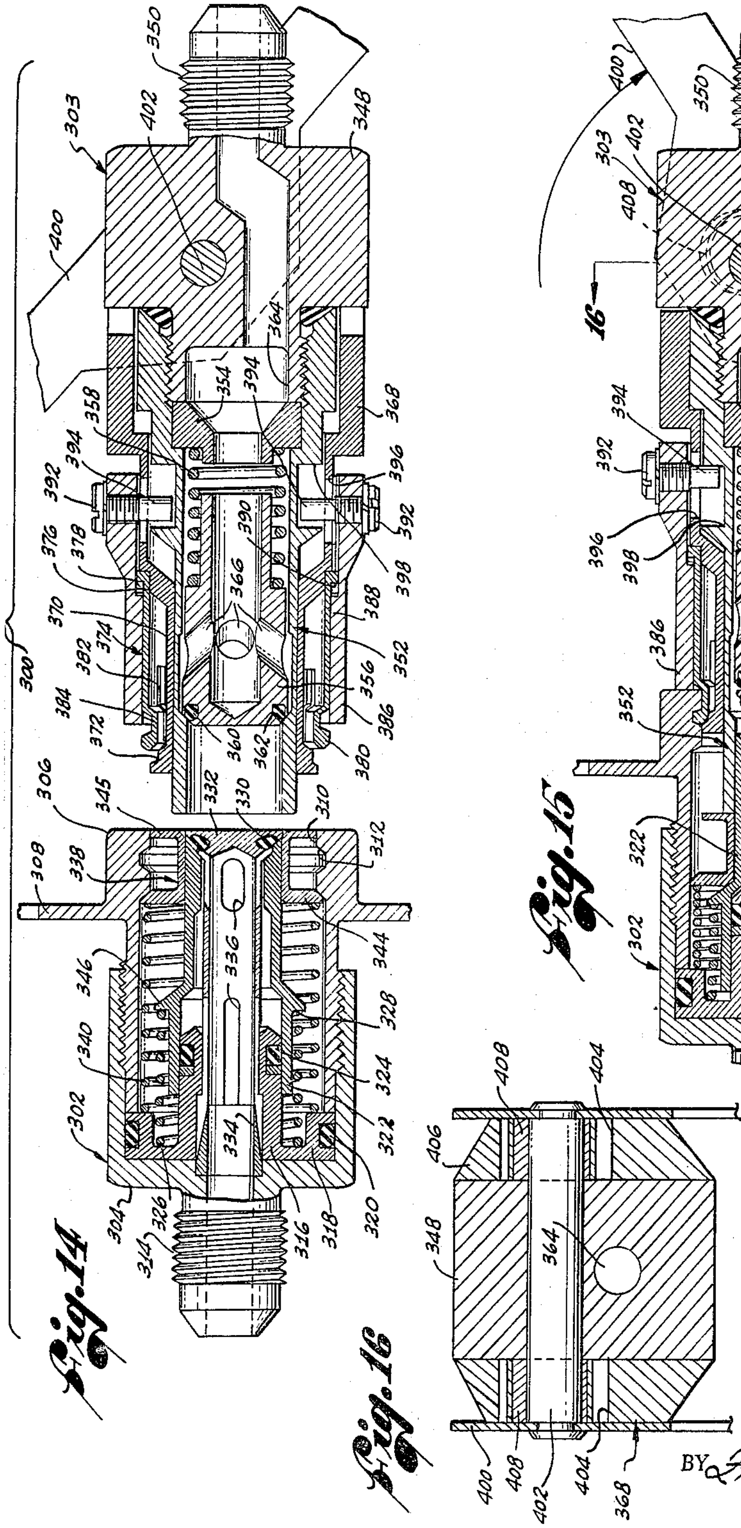
Figure 15:
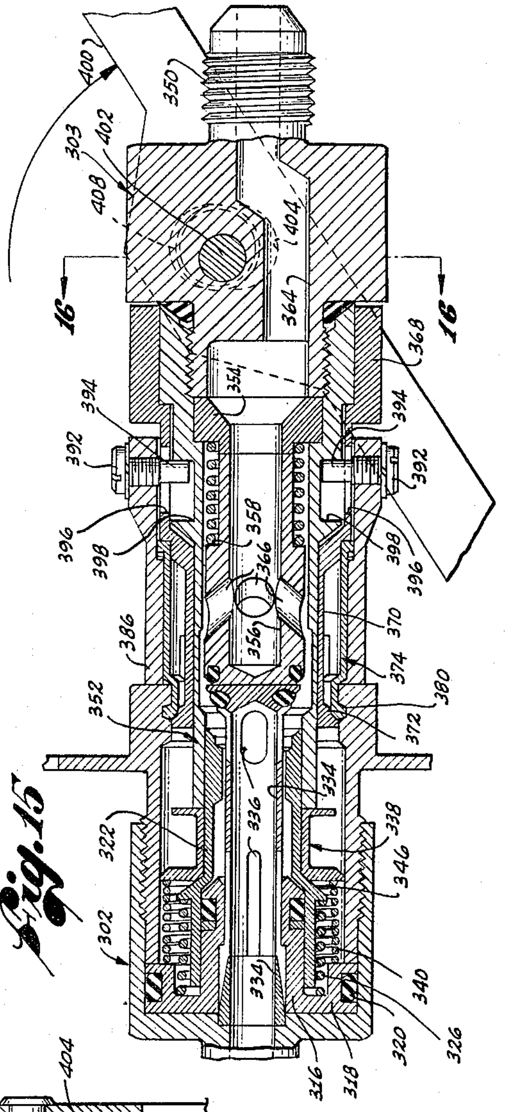
Figures 17, 18, 19, 20, 21, 22, 23:
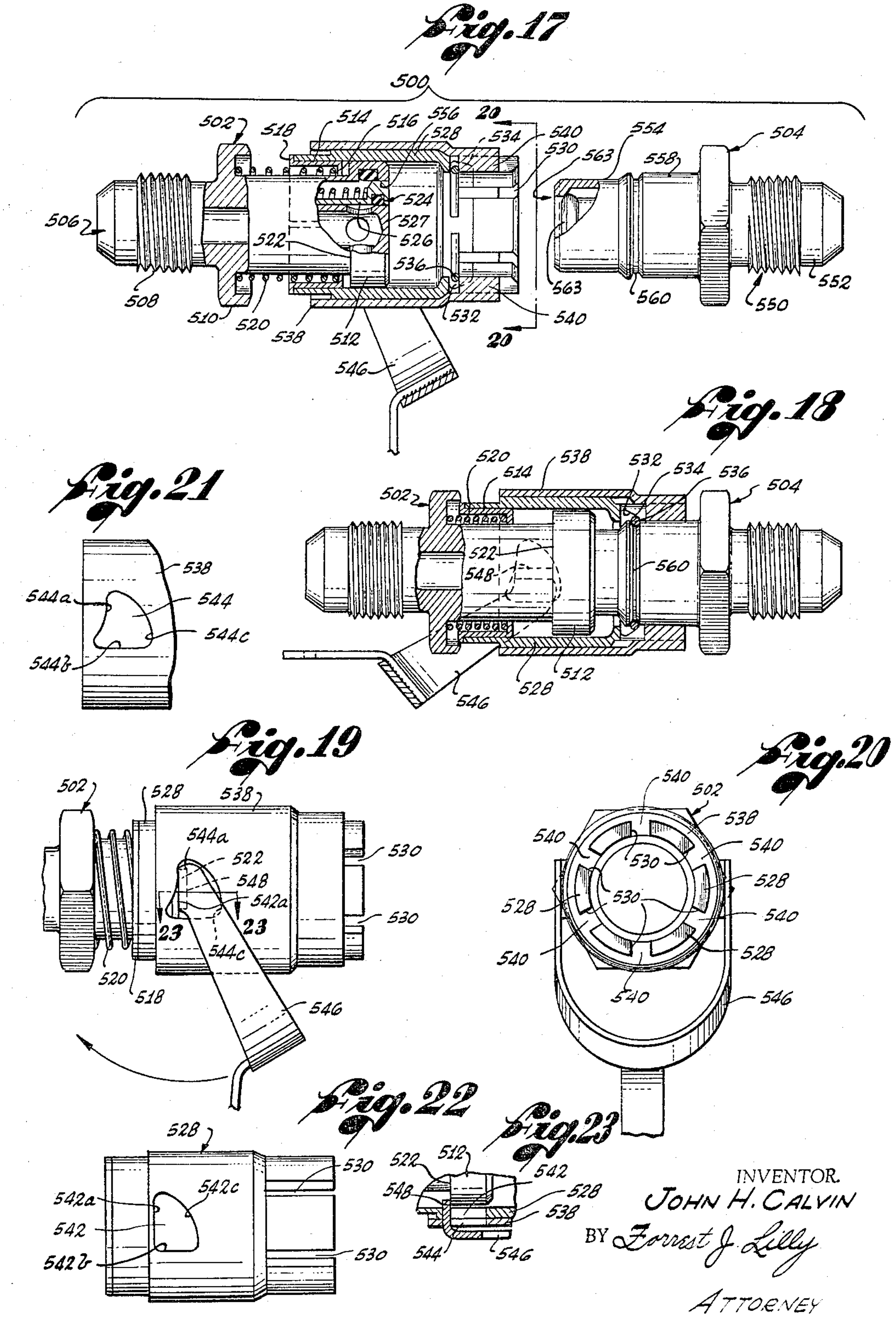

FIG. 13*a* is a detail like FIG. 13 but showing the locking ring in its released position;

FIG. 14 is a view like FIG. 1 but showing yet a further modified quick disconnect coupling according to the invention;

FIG. 15 shows the coupling of FIG. 14 after assembly and in axial section;

FIG. 16 is a section taken along line 16—16 in FIG. 15;

FIG. 17 is a view like FIG. 1 but showing a still further modified coupling of the invention;

FIG. 18 shows the coupling of FIG. 17 after assembly and in axial section;

FIG. 19 is a side elevation of the female part of the coupling in FIG. 17;

FIG. 20 is a left end view of the coupling part in FIG. 19;

FIG. 21 is a detail of a portion of a lock actuating sleeve embodied in the coupling of FIGS. 17–20;

FIG. 22 is a detail of a locking sleeve embodied in the coupling of FIGS. 17–20; and FIG. 23 is a section taken along line 23—23 in FIG. 19.

Figure 2:
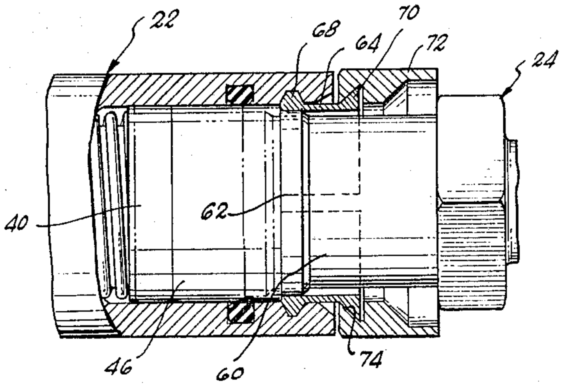
FIG. 2 shows the coupling parts of FIG. 1 after assembly, the coupling being partly sectioned for clarity.
Figure 3:
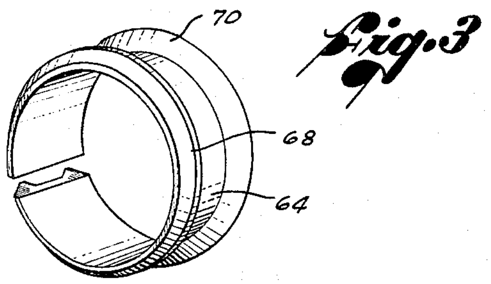
FIG. 3 is an enlarged perspective view of the locking ring used in the coupling of FIGS. 1 and 2.

The quick disconnect coupling 20 illustrated in FIGS. 1–3 of these drawings is composed of two separable coupling parts 22 and 24. On one end of the female part 22 is a threaded nipple 26 for connection to a fluid line (not shown). Extending into the other end of the female part is a bore 28. Adjacent the outer end of this bore is an internal locking groove 30. The outer end of the bore is flared at 32 to facilitate insertion of the male part 24 into the bore. Inwardly of the locking groove 30 is an internal groove containing a seal ring 34.

Extending coaxially through bore 29, in spaced relation to its wall, is a cylindrical valve support 36, the inner or left-hand end (not shown) of which is integrally joined to the part 22. Extending axially through this support is a passage 38. The left end of passage 38 opens axially through the end of the threaded stem 26. The right end of passage 38 opens radially through the support 36. Slidably mounted on the support is an annular valve 40. This valve has an internal groove containing an O-ring 42 which seals the valve to its support. A spring 44 urges the valve to its closed position of FIG. 1, wherein the valve engages the O-ring 34 to seal the female part 22 against fluid leakage from passage 38. Coacting shoulder means (not shown) on the part 22 and the valve 40 limit right-hand closing movement of the latter, under the action of spring 44, to the position of FIG. 1. The valve is opened when the coupling parts 22 and 24 are assembled, as described later.

Male coupling part 24 has a cylindrical end 46 proportioned to fit slidably in the bore 28 of female part 22 and a threaded nipple 48 for connection to a fluid line (not shown). Extending axially through the male part, and opening at its left end through the cylindrical end 46 and at its right end through the nipple 48, is a bore 50. In this bore is a valve 52 having a groove containing an O-ring 54 which seals to the wall of the bore when the valve occupies its closed position of FIG. 1. The right end (not shown) of valve 52 is slidably fitted in bore 50. Extending axially through the valve is a passage 56 which opens at its left end radially through the valve to bore 50 and at its right end axially through the stem 48. A spring 58 urges the valve to its closed position of FIG. 1

Rearwardly of its cylindrical end 46, the male part 24 has a circumferential groove 60. The forward end of this groove is reduced in depth to form a locking seat or shoulder 62. Encircling the male part within the groove 60 is a locking ring 64. This locking ring is typically constructed of spring steel and is split axially at 66 to render the ring radially yieldable. On the left end of the locking ring 64 is a radially projecting, circumferentially extending locking bead 68. The cross-section of this bead complements the cross-section of the locking groove 30 in the female part 22. The right end of the locking ring 64 has a radially projecting, circumferentially extending flange or shoulder 70.

Encircling the right end of the locking ring 64 is a lock ring actuating sleeve 72 which is preferably externally knurled. This sleeve has an internal groove 74 receiving the locking ring shoulder 70. Sleeve 72 is adapted to be gripped to move the locking ring 64 axially.

When assembling the coupling 20, the cylindrical end 46 of the male part 24 is inserted into the bore 28 in the female part 22. During this insertion, the end 46 of the male part engages the valve 40 in the female part and pushes this valve rearwardly to its open position of FIG. 2. The valve support 36 in the female part engages the valve 52 in the male part and pushes the valve rearwardly to its open position (not shown). At this time, the locking ring 64 is in its position of FIG. 1, axially spaced from the locking shoulder 62 at the shallow end of its containing groove 60.

The radial depth of the deep rear end of groove 60 is such as to permit the locking ring 64 to be cammed radially in, and thereby radially compressed, when the bead 68 on the ring engages the bevel 32 on the female part 22 during assembly of the coupling. Insertion of the male part into the female part is continued until the locking bead 68 on the ring snaps into the locking groove 30 in the latter part. When the coupling parts are now released, the valve springs 44 and 58 and the fluid pressure in the coupling urge the coupling parts apart. This results in movement of the shoulder 62 at the shallow end of the locking ring groove 60 in the male part under the forward end of the locking ring 64, to the position of FIG. 2. In this position, the locking bead 68 on the locking ring is positively restrained against yielding inward out of the locking groove 30. Accordingly, the coupling parts are positively locked against axial separation.

When it is desired to release the coupling, the parts 22 and 24 are moved toward one another to the phantom line position of FIG. 2, wherein the shoulder 62 on the male part clears the locking ring 64. The ring can then yield radially in to disengage its locking bead 68 from the locking groove 30. The locking ring is thus disengaged from the locking groove by pulling to the right on the lock ring actuating sleeve 72 while the coupling parts are held together in their phantom line positions of FIG. 2.

The coupling 100 of FIGS. 4–8 is essentially identical, both structurally and functionally, to the coupling 20 just described, except that coupling 100 has an improved lock releasing mechanism. Thus, coupling 100 comprises a female part 102 with an internal opening 106 and an internal valve mechanism 108 essentially like that in coupling 20. Valve mechanism 108 includes a spring-loaded valve 110. The female part also has an internal locking groove 112 and is flared at 114, as in coupling 20.

The male coupling part 104 has a cylindrical end 116 proportioned to fit slidably in the bore 106 of the female part. Within the male part is a valve mechanism 118 which is much like that in valve 20 and including a spring-loaded valve 120. About the male part 104 is an external circumferential groove 122 having a shallow end defining a step or shoulder 124. Encircling the male part within the groove 122 is a locking ring 126 identical to the earlier locking ring 64. Locking ring 126 has a forward locking bead 128 and a rear flange or shoulder 130. Encircling the locking ring 126 is a lock ring actuating sleeve 132 which receives the ring shoulder 130 so that axial movement of the sleeve moves the locking ring axially. When the coupling 100 is assembled, as it is in FIG. 5, the bead 128 on the locking ring 126 engages in the locking groove 112 in the female part 102 and the locking shoulder 124 on the male part engages under the forward end of the locking ring to positively restrain the latter against yielding inward to disengage the bead 128 from the groove 112. Valves 110 and 120 are opened during assembly of the coupling in the same way as were the valves in coupling 20.

As thus far described, therefore, coupling 100 is essentially identical to coupling 20. In coupling 100, however, the lock ring actuating sleeve 132 has two diametrically opposed extensions 134 which straddle two opposing flat sides of a polygonal flange 136 on the male part 104. Extending through each extension 134 is a rectangular opening 138. Under each extension, in the opposing flat side of the polygonal flange 136, is a rectangular socket 140.

Indicated at 142 is a generally semicircular lock release handle having inturned ends 144 which extend through the openings 138 in the locking ring actuating sleeve 132 and engage in the sockets 140 in the male flange 136. The inturned ends 144 of the handle 142 are generally flat and rectangular and have a width slightly greater than the width of the latter sleeve openings and sockets, whereby the ends can rotate, through an angle less than 90 degrees, in the sleeve openings and sockets. The inturned ends are disposed in a common plane inclined at an acute angle to the plane of the handle 142, as shown.

Figure 4:
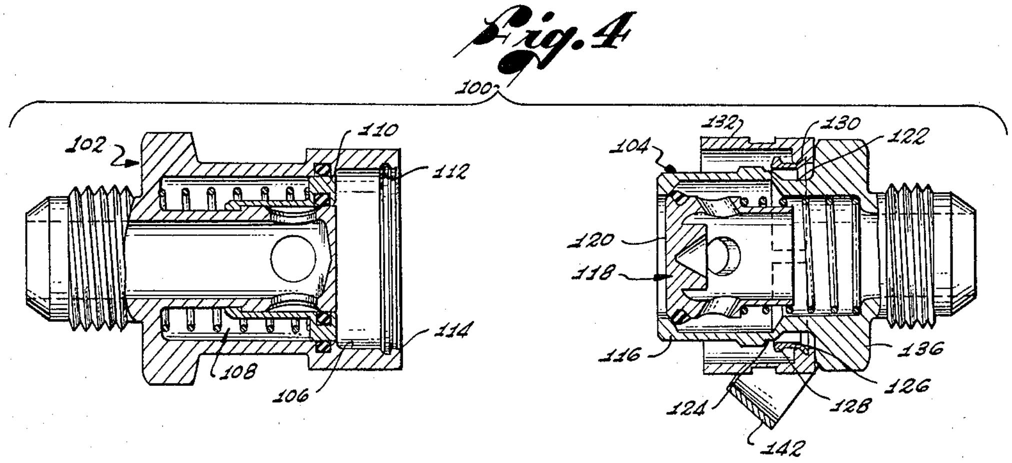
FIG. 4 is a view like FIG. 1 but showing a modified quick disconnect coupling according to the invention.

When the coupling 100 is disassembled, its coupling parts 102 and 104 appear as in FIG. 4. When assembling the coupling, the cylindrical end 116 of the male part 104 is axially inserted into the opening 106 in the female part 102. During this insertion, the valves 110 and 120 in the parts are opened, as before, and the locking ring 126 is located in the deep end of its containing groove 122. The depth of this deep end is such as to permit inward contraction of the forward end of the ring sufficiently to enable the locking bead 128 on the ring to snap into the locking groove 112 in female part 102. The coupling parts are now released, whereupon the compressed springs and fluid pressure in the coupling urges the coupling parts apart to their locked positions of FIG. 5. In these positions, the locking shoulder 124 in the shallow end of the lock ring containing groove 122 engages under the forward end of lock ring 126 to positively restrain the latter against inward contraction out of the locking groove 112. The coupling parts are thereby positively locked against separation.

In the locked positions of the coupling parts 102 and 104, the inturned ends 144 of the lock release handle 142 are disposed in a plane normal to the coupling axis and parallel to the forward and rear sides of the openings 138 in the lock ring actuating sleeve 132 and sockets 140 in flange 136. The sleeve openings 138 are offset forwardly relative to the sockets 140 so that the inturned handle ends 144 are confined between the forward walls 146 of sockets 140 and the rear walls 148 of the sleeve openings 138.

Figures 5, 6, 7:
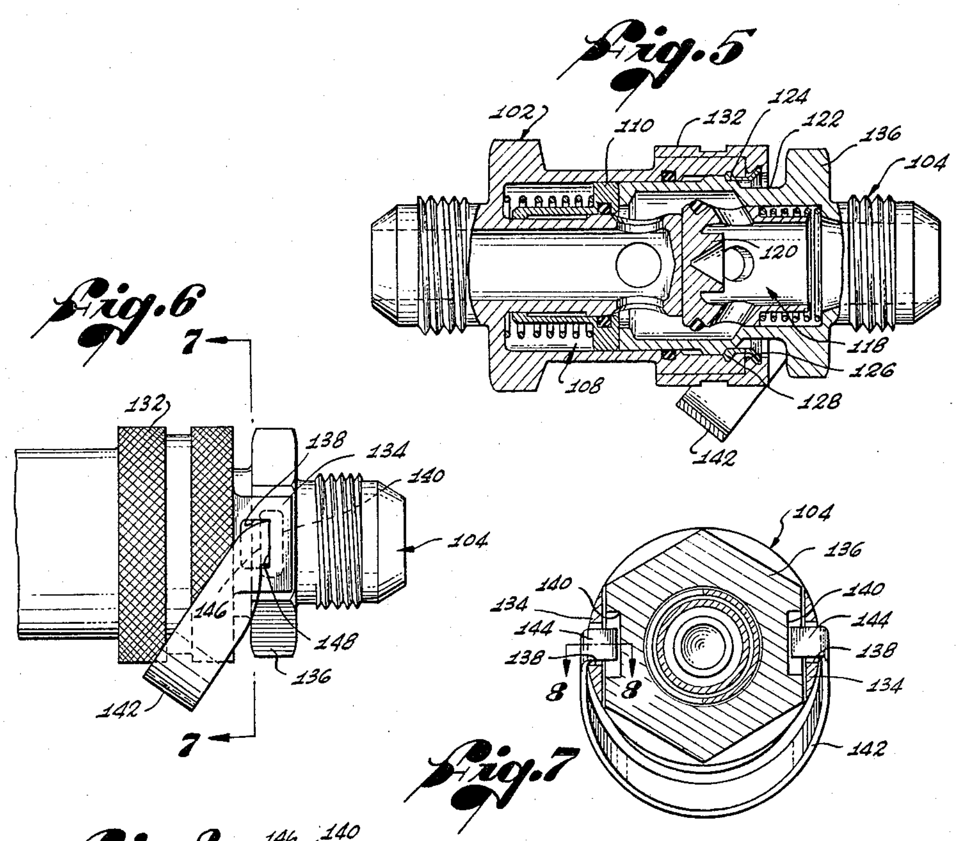
FIG. 5 shows the coupling parts of FIG. 4 after assembly, the coupling being partly sectioned for clarity.
FIG. 6 is a side elevation of the assembled coupling.
FIG. 7 is a section taken along line 7—7 in FIG. 6.
Figure 8:
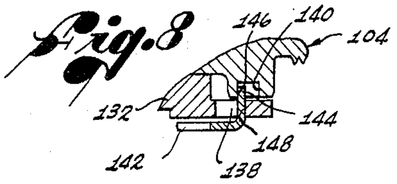
FIG. 8 is a section taken along line 8—8 in FIG. 7.

When the release handle 142 is rotated in the counterclockwise direction indicated by the arrow in FIG. 6, the inturned ends 144 of the handle rotate between the forward socket walls 146 and the rear hole walls 148 and thereby act to cam the locking ring actuating sleeve 132 to the rear, that is, toward polygonal flange 136. This pulls the locking ring 126 and the entire female part 102 to the right toward flange 136. It is apparent that rotation of the handle 142 in this way eventually pulls the locking ring 126 clear of shoulder 124 at the shallow end of locking ring groove 122 in the male part, thereby releasing the coupling ring to yield inwardly, out of the locking groove 112 in the female part 102. The coupling parts are then free to separate under the action of the compressed valve springs and fluid pressure in the coupling or by external force on the coupling.

The quick disconnect coupling 200 in FIGS. 9–13*a* is composed of a female part 202 and a male part 204. Female part 202 has a circular axial opening 206 including an axially short, forward bore 208, an internal locking groove 210 immediately to the rear of bore 208, a shoulder 212 immediately to the rear of the locking groove, and an enlarged, smooth-walled bore 214 behind the shoulder. Locking groove 210 tapers to a shallower depth toward the forward, open end of the female part to define a locking seat or shoulder 216 at the shallow forward end of the groove. Contained in the locking groove is a split, resilient locking ring 218.

Slidably fitted in the forward end of the female coupling part 202 is a lock ring actuating sleeve 220. The forward end of this sleeve has radially inwardly directed fingers 222 which extend through axial slots 224 in the female part 202. The inner ends of these fingers are radially slotted to receive the locking ring 218, as may be best observed in FIGS. 13 and 13*a*. The locking ring can, therefore, be shifted back and forth between the deep and shallow ends of locking groove 210 by sliding the lock ring actuating sleeve 220 back and forth on the female part 202.

Under the rear end of sleeve 220 is an external circumferential groove 224 in the female part. Encircling the female part within this groove and acting between the rear wall of the groove and an annular shoulder 226 within the sleeve 220 is a spring 228. This spring urges the sleeve 220 forwardly relative to the female part 202 to the position of FIG. 9, wherein the locking ring 218 is located in the shallow end of locking groove 210 and engages the locking shoulder 216 of the groove. Encircling the female part 202 at the forward end of its external groove 224 is a wear ring 230 which seats against the forward wall of the groove.

Indicated at 232 is a generally semicircular lock release handle. This handle has flat inturned ends 234 which are disposed in a common plane inclined at an acute angle to the plane of the handle, as may be best seen in FIG. 10. These inturned ends of the handle extend through diametrically opposed, circular holes 236 in the lock ring actuating sleeve 220 and into the forward end of the external groove 224 in the female part. When the sleeve occupies its forward locking position of FIGS. 9 and 10, the inturned handle ends parallel and abut the wear ring shoulder 230 on the female part and engage the rear walls of the sleeve holes 236.

Figure 9:
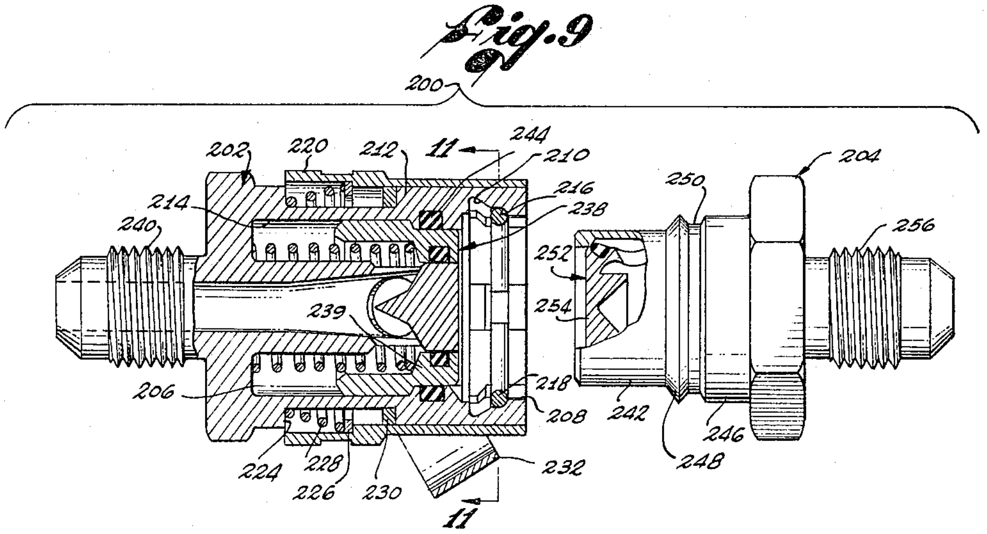
FIG. 9 is a view like FIG. 1 but showing a further modified coupling according to the invention.
Figure 11:
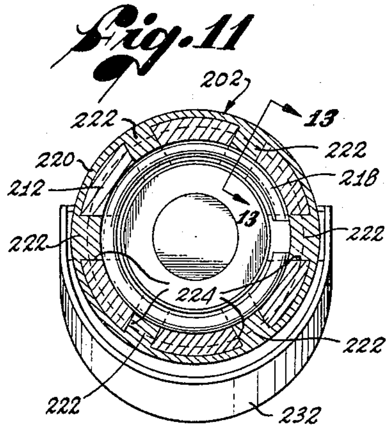
FIG. 11 is a section taken along line 11—11 in FIG. 9.
Figure 10:
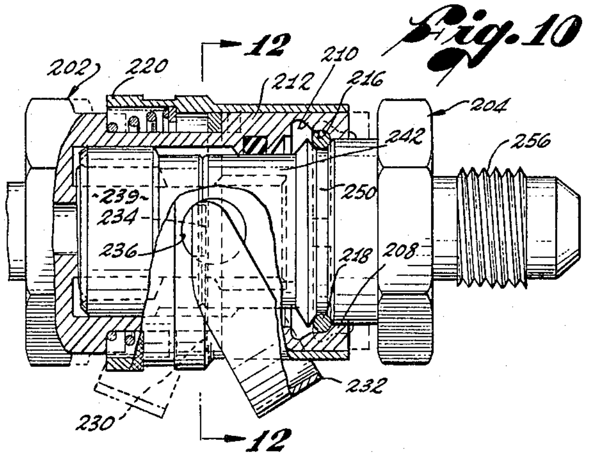
FIG. 10 shows the coupling of FIG. 9 after assembly, the coupling being partly sectioned for clarity.

When the release handle 232 is rotated from its full line position to its phantom line position in FIG. 10, the inturned ends 234 of the handle rotate between the shoulder 230 on the female part 202 and the rear walls of holes 236 in lock ring actuating sleeve 220 and force the sleeve rearwardly relative to part 202, against the action of spring 228. Locking ring 218 is thereby pulled rearwardly into the deep end of its containing groove 210. When the handle is released, the spring 228 returns the sleeve, handle, and locking ring to their locking positions of FIGS. 9 and 10.

Within the female part 202 is a valve mechanism 238, including a spring-loaded valve 239, much like the valve mechanism in the female part of coupling 20 described earlier. The female part also has a threaded nipple 240, as before, for connection to a fluid line.

Male coupling part 204 has a cylindrical forward end 242 which is proportioned to fit slidably within the circular opening through the internal shoulder 212 of the female part 202. This shoulder has a groove containing an O-ring 244 which seals to the valve 239 in the female part when the coupling parts are separated and to the forward end 242 of the male part 204 when the coupling parts are assembled, as in FIG. 10.

Rearwardly of its cylindrical end 242, the male part 204 is radially enlarged to form a circumferential shoulder 246. The forward end wall 248 of this shoulder is beveled. Within the shoulder 246, directly to the rear of its beveled forward wall 248, is a locking groove 250. The forward wall of this groove is beveled somewhat, as shown.

Within the male part 204 is a valve mechanism 252, including a spring-loaded valve 254, much like the valve mechanism in the male part of coupling 20 described earlier. The part has a threaded nipple 256 for connection to a fluid line.

When the coupling 200 is disassembled, the coupling parts 202 and 204 appear as in FIG. 9. The coupling is assembled by inserting the cylindrical forward end 242 of the male part 204 into the opening 206 in the female part 202. During this insertion, the forward wall 248 on the male part engages the locking ring 218, which is currently seated in the shallow end of its locking groove 210, as shown in FIG. 9, and pushes the ring rearwardly into the deep end of the locking groove. The ring may expand somewhat as it enters the deep end of its groove. The ring is prestressed, however, to have a normal inside diameter slightly less than the diameter of shoulder 246 on the male part. The depth of the deep end of locking groove 210 is such as to permit the locking ring to expand outwardly to clear the shoulder 246. Accordingly, when the locking ring 218 is pushed rearwardly by the shoulder 248 on the male part, into contact with the rear wall of locking groove 210, slight further insertion of the male part forces the forward end of the shoulder 246 on the latter part through the ring, which thus expands outwardly in the deep end of groove 210 and finally snaps into the locking groove 250 in the male part. The valves 239 and 254 are opened, as before, during this assembly of the coupling.

The coupling parts 202 and 204 are now released, whereupon the compressed valve springs and fluid pressure in the coupling urge the coupling parts apart. This results in forward movement of the locking ring 218 in its locking groove 210 to its locked position of FIG. 10. In this position, the ring is situated in the shallow end of the groove 210, in engagement with the locking shoulder 216 thereof, and the coupling parts are positively locked against separation.

When disconnecting the coupling, the lock release handle 232 is rotated from its solid line position to its phantom line position in FIG. 10. This action forces the lock ring actuating sleeve 220 and locking ring 218 rearwardly relative to the female part 202 and thereby draws the male part 204 into the female part, against the force of the compressed valve springs and fluid pressure in the coupling. As the locking ring is thus forced to the rear in its groove 210, it enters the deep end of the groove. The spring and fluid pressures on the male part thrust the forward beveled wall of its locking groove 250 against the now retracted locking ring 218, thereby expanding the latter outwardly in the deep end of its groove 210 and releasing the male part for separation from the female part. The spring 228 in the female part then returns the lock ring actuating sleeve 220, handle 232, and locking ring 218 to their locking positions of FIG. 10.

The quick disconnect coupling 300 in FIGS. 14–16 possesses one primary advantage over the couplings described thus far. This advantage resides in the fact that during assembly of the coupling, the coupling parts 302 and 303 are locked together prior to opening of the valves in the parts. During disassembly, the valves close prior to release of the lock between the coupling parts.

Female coupling part 302 comprises a rear body 304 which is internally threaded at its forward end and a forward body 306 which is threaded in body 304. The forward body 306 has an external mounting flange 308 and a forward axial bore 310 with an internal locking groove 312. On the rear end of coupling part 302 is a threaded nipple 314 for connection to a fluid line.

Within the coupling part 302 is a coaxial cylindrical support 316 having a rear flange 318 clamped between the forward and rear bodies 304 and 306 of the female part. A seal ring 320 seals the flange 318 to the body 304. Slidably fitted on the support 316 is a floating valve sleeve 322. An O-ring 324 contained in an external groove in support 316 seals the latter to the valve sleeve 322. Valve 322 is urged forwardly, relative to the support 316, to the closed position of FIG. 14, by a spring 326 which acts between the flange 318 of the support 316 and an external shoulder 328 on the valve sleeve. In this closed position, the forward end of the valve sleeve, which is beveled, as shown, seats against an O-ring 330 contained in a groove in an enlarged, radially tapered bead 332 integral with the forward end of a guide sleeve 334. This guide sleeve extends through the support 316 and has an enlarged rear end which is clamped between the body 304 of female part 302 and the support 316. The wall of the guide sleeve is ported at 336.

Slidably mounted on the forward end of the valve sleeve 332 is a pressure ring 338. This pressure ring is urged forwardly to its closed position of FIG. 14, within bore 310, by a spring 340 which acts between the ring and the rear flange 318 of support 316. Pressure ring 338 has a rear flange 342 which is slightly larger in diameter than bore 310 and seats against a shoulder 344 at the rear of bore 310 when the ring occupies its closed position of FIG. 14. A forward flange 345 on the ring is flush with the forward end of body 306 in this closed position. Ring 338 is slidable rearwardly on the valve sleeve 322 to a position of contact with an external shoulder 346 on the sleeve.

Male coupling part 303 comprises a body 348 with a rear threaded nipple 350 for connection to a fluid line. The forward end of this body is reduced and threaded. Threaded on this latter end of the body is a cylindrical support 352. An O-ring is placed, as shown, to seal the body 348 to the support 352. Rigidly clamped between the body and support is an annular spring seat 354. Within the support 352, forwardly of spring seat 354, is a valve 356. A spring 358 acts between the seat 354 and an external shoulder on valve 356 to urge the latter forwardly in the support 352 to the closed position of FIG. 14. In this closed position, an O-ring 360, contained in a groove in the forward end of the valve, engages an internal annular valve seat 362 in the forward end of support 352. Extending through the male coupling part 303 is a fluid passage 364 which opens at its rear end axially through nipple 350 and at its forward end radially through ports 366 in the valve 356.

Slidably mounted on the support 352 is a lock sleeve 368. This lock sleeve has a circumferential groove 370 at its forward end. The forward end of groove 370 is reduced in depth to form a locking seat or shoulder 372. Encircling the lock sleeve 368, within its groove 370, is a locking ring 374. The rear end of this ring fits slidably over a reduced cylindrical shoulder 376 of the lock sleeve and has an outwardly directed flange 378. About the forward end of the locking ring 374 is an outwardly directed locking bead 380 whose cross-section complements that of the locking groove 312 in female part 302. Locking ring 374 has a plurality of circumferentially spaced slits 382 extending axially into its forward end and defining therebetween radially flexible fingers 384.

Slidably fitted on the lock sleeve 368 and the lock ring 374 is an outer sleeve 386. The locking ring flange 378 is confined between a shoulder 388 on this outer ring and a shoulder 390 on the lock sleeve 368. Threaded in the rear end of the outer sleeve 386 are a pair of diametrically opposed screws 392 having smooth cylindrical ends 394 which extend through axial slots 396 in the lock sleeve 368 into a circumferential groove 398 in the support 352. The length of slots 396 is approximately equal to the width of groove 398.

Indicated at 400 is a lock release handle which straddles the rear body 348 of male coupling part 303. Journaled in body 348 for rotation on an axis normal to the coupling axis is a shaft 402. The ends of this shaft extend through openings 404 in rear extension 406 on the lock sleeve 368 which slidably straddle the body 348. On the shaft 402, within the openings 404, are circular eccentrics 408. Handle 400 fits over opposite ends of the shaft 402 and these ends are then upset to retain the handle on the shaft. Eccentrics 408 are pinned or otherwise fixed to the handle 400 so as to rotate with the latter. As shown best in FIG. 15, lock sleeve openings 404 are elongated in a plane normal to the coupling axis. Eccentrics 408 have a diameter approximately equal to the width of openings, or slots, 404, measured in the axial direction of the coupling. Eccentrics 408 are similarly oriented about the rotation axis of handle 400.

From this description, it is apparent that rotation of handle 400 is effective to axially reciprocate the lock sleeve 368 relative to support 352. Screws 392 and slots 396 form a lost-motion connection between the lock sleeve and the outer sleeve 386, whereby the latter is moved axially by the lock sleeve.

When the coupling 300 is disconnected, the coupling parts 302 and 303 appear as in FIG. 14. To assemble the coupling, the forward end of the male part 303 is axially inserted into the forward end of the female part 302. During this insertion, the forward end of the male support 352 engages the female pressure ring 338 and forces the latter back along the female valve sleeve 322, against the action of spring 340. The valve sleeve remains in its closed position of FIG. 14. At this time, the lock sleeve 368, lock ring 374, and outer sleeve 386 of the male part 303 occupy forward positions on the male support 352 and the handle 400 is positioned at an angle, as shown in FIG. 14. The forward end of the lock ring 374, however, it to the rear of the locking shoulder 372 of lock sleeve 368 so that the lock sleeve fingers 384 are free to yield inwardly.

The male part 303 is inserted into the female part 302 to an initial position wherein the pressure ring 338 just engages the shoulder 346 of the female valve sleeve 322 and the locking bead 380 on the male locking ring 374 snaps into the female locking groove 312. As just noted, the fingers 384 of the locking ring are free to yield inwardly at this time so that the forward end of the ring can be inserted to a position wherein the bead 380 snaps into the groove 312. In this initial position of insertion, the forward end 332 of the female support 334 just engages the male valve 356. The valves in both coupling parts are, therefore, currently closed.

After the male part 303 has thus been inserted to its initial position in the female part 302, the handle 400 is rotated from its position of FIG. 14 to its position of FIG. 15. During the first part of this handle rotation, the male support 352, which presses against the female pressure ring 338, and the male locking ring 374, which engages in the female locking groove 312, tend to remain stationary relative to the female part 302 so that rotation of the ecccentrics 408 with the handle moves the male lock sleeve 368 to the rear relative to the male part, until the locking shoulder 372 of the lock sleeve engages under the forward end of the locking ring 374 to positively retain the locking bead 380 on the ring in the female locking groove 312 and thereby positively lock the coupling parts against separation. This locked position of the locking ring and lock sleeve is shown in FIG. 15.

During the remaining angle of rotation of handle 400 to the position of FIG. 15, the male lock sleeve 368 remains stationary relative to the female part 302 so that rotation of the eccentrics 408 forces the male support 352 forwardly toward the female part 302. This forward motion of the support forces the female pressure ring 338 against the female valve sleeve shoulder 346 and thereby retracts the valve sleeve 322 rearwardly in the female part, against the action of valve spring 326, to its open position of FIG. 15. Forward motion of the male support 352 simultaneously forces the male valve 356 forwardly against the female valve support 334, thereby opening the valve as shown in FIG. 15. The final forward travel of the male valve support 352 takes up the lost motion in the lost-motion connections 394, 396 between this support and the outer sleeve 386 of the male part, after which the latter sleeve moves forwardly with the male valve support to finally press firmly against the forward end of the female coupling part 302. This forced contact of the outer sleeve 386 against the female coupling part mechanically reinforces the completed coupling against bending moments between the coupling parts.

The coupling 300 is disassembled by rotating the handle 400 back to its position of FIG. 14 and then pulling the coupling parts 302 and 303 apart. During this rotation of the handle, the valves 322 and 356 in the parts obviously reclose during the initial part of the handle rotation. During the final part of the handle rotation, the male lock sleeve 368 is moved forwardly to release the male locking ring 374 for disengagement from the female locking groove 312 by pulling on the coupling parts. In actual practice, spring 340 and the fluid pressure trapped in the coupling between the valves 322 and 356 when the latter reclose may separate the coupling parts when the male locking ring is released.

The quick disconnect coupling 500 of FIGS. 17–20 is similarly designed to effect locking of the coupling parts together before opening of the coupling valves when assembling the coupling, and closure of the valves before release of the coupling lock during disassembly of the coupling. Coupling 500 is composed of coupling parts 502 and 504. Female coupling part 502 has a body 506 with a rear threaded nipple 508 for connection to a fluid line, a central flange 510, and an enlarged cylindrical forward end 512. Encircling the body 506 between the flange 510 and enlarged end 512 is a ring 514. Ring 514 has a forward inturned flange 516 and a rear outturned flange 518. The inturned flange 516 fits slidably on the body 506. Acting between this latter flange and the body flange 510 is a spring 520. Spring 520 urges the ring 514 forwardly to a limiting position against the shoulder 522 at the rear of the enlarged end 512.

Body 506 contains a valve mechanism 524 like the valve mechanism in the female part of the earlier coupling 20. Valve mechanism 524 includes an annular, spring-loaded valve 526 and a central support 527 therefor.

Slidably mounted on the forward end 512 of body 506 is a lock sleeve 528. The rear end of this sleeve fits closely about the ring 514 and seats against the outturned ring flange 518. The forward end of the ring is reduced somewhat in diameter. Extending axially into the forward end of the sleeve are a series of uniformly spaced slots 530. Within the forward end of the sleeve, at the rear ends of its slots 530, is a circumferential locking groove 532. This locking groove has the same cross-section as the locking groove 210 in FIG. 9 and like the latter groove tapers to a shallower depth at its forward end to form a forward locking seat or shoulder 534. Contained in this groove is a split locking ring 536.

Locking sleeve 528 slidably supports a lock ring actuating sleeve 538. The forward end of this actuating sleeve is reduced in diameter to match the lock sleeve 528. Within the forward end of the actuating sleeve are a series of axially disposed, inwardly directed fingers 540 which extend slidably through the slots 530 in the lock sleeve. The inner diameter of these fingers is about equal to the inner diameter of the forward end of the lock sleeve.

Lock sleeve 528 has a pair of diametrically opposed openings 542. Lock ring actuating sleeve 538 has a pair of diametrically opposed openings 544. Openings 542 conform generally to isosceles triangles and each has a straight rear edge 542*a* normal to the sleeve axis, an equal straight side edge 542*b* parallel to the axis, and a forward curved edge 542*c*. The openings 544 in the actuating sleeve 538 are identical to openings 542 except that the rear edges 544*a* of openings 544 incline rearwardly at a small angle as they approach their respective side edges 544*b*. Sleeve openings 542 and 544 are aligned when the lock sleeve 528 and actuating sleeve 538 occupy their normal forward positions of FIGS. 17 and 19.

Indicated at 546 is a lock actuating handle. This handle, like the earlier handles, is generally U-shaped and straddles the lock actuating sleeve 538. Handle 546 has inturned ends 548 disposed in a common plane inclined at a small angle to the plane of the handle. These inturned handle ends have a width approximately equal to the length of the equal edges of the sleeve openings 542 and 544 and extend through the openings into the circumferential recess in body 506, behind its shoulder 522. When the sleeves 528 and 538 occupy their forward extended positions of FIGS. 17 and 19, the handle ends 548 are normal to the sleeve axis and are confined between the shoulder 522 on body 506 and the rear edges 542*a*, 544*a* of sleeve openings 542, 544.

Male coupling part 504 comprises a body 550 having a rear threaded nipple 552 for connection to a fluid line and a forward cylindrical end 554 which is proportioned to fit closely within the bore 556 in the body of the female coupling part 502. Behind the end 554 is a radially enlarged shoulder 558 containing a forward lock groove 560. The forward edge 562 of shoulder 558 is beveled. Part 504 contains a valve mechanism 563, including a spring-loaded valve 563*a*, like that in the male part of coupling 20.

Prior to assembly of the coupling 500, its parts 502 and 504 appear as in FIG. 17. At this time,, the lock ring 536 is in the deep rear end of its containing groove 532. When assembling the coupling, the forward end 554 of the male part is inserted through the forward ends of the lock sleeve 528 and actuating sleeve 538 to an initial position wherein the forward end of the male part contacts the valve 526 in the female part without opening the valve and the forward end of the valve support 527 contacts the valve 563a in the male part without opening the valve. The coupling elements are proportioned so that during this initial insertion, the lock ring 536 snaps into the lock groove 560 in the male part. At this time, however, the lock ring is free to expand so that the coupling can be pulled apart.

The next step in assembling the coupling is to rotate the handle 546 from its position of FIGS. 17 and 19 to its position of FIG. 18. The inturned ends 548 of the handle are thereby rotated between the shoulder 522 of the body 506 of female coupling part 502 and the rear edges 542a, 544a of the lock sleeve and actuating sleeve openings 542, 544. Rotation of the handle ends 548 is obviously immediately effective to cam the lock sleeve 528 rearwardly against the action of its spring 520. The spring and fluid pressure on the valves 526 and 563a holds the male part 504 stationary during this rearward movement of the lock sleeve. As a result, during initial rotation of the handle 546, the lock sleeve moves rearwardly relative to its lock ring 536, which is currently engaged in the locking groove 560 in the male part, whereby the ring enters the shallow end of its containing groove 532. The ring then engages the locking shoulder 534 of its containing groove, so that the ring is positively restrained against expanding out of the locking groove 560 and the coupling parts are positively locked together. During final rotation of the handle to its position of FIG. 18, the lock sleeve 528 continues to be cammed rearwardly, but now it forces the male part 504 against the valve 526 and valve support 527 in the female part, thereby opening both the valves 526 and 563a.

The outer actuating sleeve 538, of course, tends to move rearwardly with the lock sleeve. However, because of the rearward incline of its rear opening edges 544a, rotation of the handle 546 from its position of FIGS. 17 and 19 releases the sleeve 538 for limited forward movement relative to the lock sleeve. In actual practice, when the handle is rotated from its position of FIGS. 17 and 19 toward its position of FIG. 18, the actuating sleeve moves rearwardly with the lock sleeve until the fingers 540 on the actuating ring engage the lock ring 536. The actuating sleeve then remains stationary with the lock ring while the lock sleeve continues to be cammed rearwardly to locate the ring in the shallow end of its containing groove 532, as just explained. During final rotation of the handle 546 to its position of FIG. 18, the lock sleeve and actuating sleeve move rearwardly in unison with one another and with the male part 504. The handle ends 548 are designed to rotate slightly past a dead center position in the sleeve openings 542 and 544, thereby to releasably secure the coupling in locked condition.

When the handle is returned to its position of FIGS. 17 and 19, the spring 520 as well as the spring and fluid pressure on valves 526 and 563a move the lock sleeve 528, actuating sleeve 538, and male part 504 to the right in unison as the handle rotates. Final rotation of the handle ends 548 to their position of FIG. 19 moves the actuating sleeve rearwardly relative to the lock sleeve to move the lock ring 536 to the deep end of its containing groove 532. The coupling can now be pulled apart if the handle 546 is held to restrain the lock ring from re-entering the shallow end of its groove. The handle may be rotated past the position of FIGS. 17 and 19 to positively eject the male part 504. Thus, if the handle is rotated beyond its position of FIG. 19 (in a counterclockwise direction), both sleeves 528 and 538 are positively cammed rearwardly in unison so that the lock ring 536 is positively retained in the deep end of its groove 532 by the actuating sleeve. The male part 504 is forced against the valve 526 as before by such rearward movement of the sleeves. Since the lock ring is now free to expand radially, however, the male part is ejected.

It is now apparent that in all disclosed forms of the invention, the coupling lock releasing, or actuating, handle forms a force-multiplying lever means which is operatively connected between the locking ring and the coupling part which carries the ring in such manner as to exert a forward force on the latter part relative to the ring. Assuming the coupling to be assembled and locked, this force acts to move the two coupling parts together from their locked positions, wherein the locking bead on the locking ring is located in the shallow end of its containing groove, to unlocked positions, wherein the bead is located in the deep end of its containing groove. The coupling parts are thereby released for separation by the spring and fluid pressures active on the parts.

It is clear, therefore, that the couplings hereinbefore described and illustrated are fully capable of attaining the several objects and advantages preliminarily set forth. While certain preferred embodiments of the invention have been disclosed, numerous modifications in the design and arrangement of parts of the invention are possible within the scope of the following claims.

I claim:

1. A quick disconnect coupling comprising:

a male coupling part having a generally cylindrical forward end, a female coupling part having a generally circular opening through its forward end receiving the forward end of said male part, said male part having a circumferential groove in its external surface opening radially toward said female part, and said female part having a circumferential groove in its internal surface opening radially toward said male part, the groove in one of said parts comprising a locking groove and the groove in the other part comprising a stepped lock ring containing groove having a relatively shallow forward end and a relatively deep rear end and an annular rearwardly presented thrust shoulder at the forward end of said containing groove disposed in a transverse plane of said other part, the shallow end of said containing groove defining a coaxial, cylindrical, radially presented locking shoulder having an axial length approximating the axial width of said locking groove, a radially yieldable lock sleeve extending circumferentially of said other part within said containing groove and having a radially projecting locking bead at its forward end engaging in said locking groove, the rear end of said lock sleeve being located externally of said female part, said coupling parts being relatively axially movable toward one another to unlocked positions, wherein the deep end of said containing groove is radially aligned with said locking groove, and said coupling parts being relatively axially movable away from one another to locked positions, wherein said locking shoulder is radially aligned with said locking groove, the radial depth of the shallow end of said containing groove being less than the radial cross-sectional dimension of the forward end of said lock sleeve at said locking bead and the radial depth of the deep end of said containing groove being greater than said radial cross-sectional dimension, said locking bead having a normal diameter to snap into said locking groove when said coupling parts are assembled to said unlocked positions and said locking bead is radially aligned with said locking groove, the forward wall of said locking groove and the rear surface of said locking bead comprising first coacting camming surfaces which are effective to cam said locking bead radially to a given diameter and out of said locking groove upon axial thrust of said coacting surfaces against one another, and the forward end surface of said one coupling part and the forward surface of said locking bead comprising second coacting camming surfaces which are effective to cam said locking bead radially to said given diameter upon axial thrust of said second coacting camming surfaces against one another, and means coacting between said other coupling part and the rear end of said lock sleeve to limit rearward movement of said lock sleeve relative to said other coupling part to a retracted position wherein said locking bead is located in the deep end of said containing groove.

2. A quick disconnect coupling comprising:

a male coupling part including a cylindrical forward end having an external circumferential lock ring containing groove with a realtively shallow forward end and a relatively deep rear end, and an annular rearwardly presented thrust shoulder at the forward end of said groove disposed in a plane transverse to the axis of said part, the shallow end of said containing groove defining a coaxial, cylindrical, radially presented locking shoulder having an axial length approximating the axial width of said locking groove, a female coupling part having a circular opening receiving the forward end of said male part and having an internal circumferential locking groove opening radially toward said containing groove, a radially yieldable lock sleeve encircling said male part within said containing groove and having at its forward end an external locking bead engaging in said locking groove, the rear end of said lock sleeve being located externally of said female part, said coupling parts being relatively axially movable toward one another to unlocked positions, wherein said forward end of said lock sleeve is located in the deep end of said containing groove, and said coupling parts being relatively axially movable away from one another to locked positions, wherein said forward end of said lock sleeve seats on said locking shoulder and contacts said thrust shoulder, the radial depth of said shallow end of said containing groove being less than the radial cross-sectional dimension of the forward end of said lock sleeve at said locking bead and the radial depth of the deep end of said containing groove being greater than said radial cross-sectional dimension, said locking bead having a normal external diameter greater than the diameter of said circular opening, the forward wall of said locking groove and the rear surface of said locking bead comprising first coacting camming surfaces which are effective to contract said bead to the diameter of said opening upon axial thrust of said coacting surfaces against one another when said parts are in said unlocked positions, and the forward end surface of said female part and the forward surface of said locking bead comprising second coacting camming surfaces which are effective to contract said bead to the diameter of said opening upon axial thrust of said second coacting surfaces against one another, and means coacting between said male coupling part and the rear end of said lock sleeve externally of said female part to limit rearward movement of said lock sleeve relative to said male part to a retracted position, wherein said locking bead is located in the deep end of said containing groove.

3. A quick disconnect coupling comprising:

a male coupling part having a generally cylindrical forward end, a female coupling part having a generally circular opening through its forward end receiving the forward end of said male part, said male part having a circumferential groove in its external surface opening radially toward said female part, and said female part having a circumferential groove in its internal surface opening radially toward said male part, the groove in one of said parts comprising a locking groove and the groove in the other part comprising a lock ring containing groove having a relatively shallow forward end and a relatively deep rear end, a radially yieldable lock ring extending circumferentially of said other part within said containing groove and engaging in said locking groove, said coupling parts being relatively axially movable toward one another to unlocked positions, wherein the deep end of said containing groove is radially aligned with said locking groove, and said coupling parts being relatively axially movable away from one another to locked positions, wherein the shallow end of said containing groove is radially aligned with said locking groove, spring means for yieldably urging said coupling parts toward said locked positions, the radial depth of the shallow end of said containing groove being less than the radial cross-sectional dimension of said lock ring and the radial depth of the deep end of said containing groove being greater than said radial cross-sectional dimension of said ring, and force multiplying means operatively coacting between said lock ring and said other coupling part for relatively axially moving said lock ring and said other coupling part from a position wherein said ring is located in the shallow end of said containing groove to a position wherein said ring is located in the deep end of said containing groove, whereby when said coupling parts are in said locked positions, said force multiplying means is effective initially to move said coupling parts toward one another to said unlocked positions against the action of said spring means and thereafter to retract said lock ring rearwardly relative to said other coupling part to disengage said lock ring from said locking groove, thereby to release said coupling parts for axial separation.

4. A quick disconnect coupling according to claim 3 wherein:

the internal groove in said female part comprises said locking groove and the external groove in said male part comprises said containing groove, said lock ring comprises a radially resilient lock sleeve surrounding said male part within said containing groove and having an external locking bead at its forward end engaging in said locking groove and having its rear end extending externally of said female part, and said force multiplying means comprising camming means operatively coacting between the rear end of said lock ring sleeve and said male coupling part.

5. A quick disconnect coupling according to claim 3 wherein:

the internal groove in said female part comprises said containing groove and the external groove in said male part comprises said locking groove, said lock ring being contained within said containing groove in said female part, a sleeve operatively connected at its forward end to said lock ring, and said force multiplying means comprising camming means operatively coacting between the rear end of said sleeve and said female part.

6. A quick disconnect coupling according to claim 3 wherein said force multiplying means comprises:

rearwardly presented thrust surface means on said other part, forwardly presented thrust surface means on said lock ring rearwardly of said rearwardly presented thrust surface means, a lever, and camming means operatively connected to said lever and acting between said thrust surface means for camming said thrust surface means away from one another upon rotation of said lever in one direction.

7. A quick disconnect coupling comprising:
a male coupling part having a generally cylindrical forward end,
a female coupling part having a generally circular opening through its forward end receiving the forward end of said male part,
said male part having a circumferential groove in its external surface opening radially toward said female part, and said female part having a circumferential groove in its internal surface opening radially toward said male part,
the groove in one of said parts comprising a locking groove and the groove in the other part comprising a lock ring containing groove having a relatively shallow forward end and a relatively deep rear end,
a radially yieldable lock sleeve extending circumferentially of said other part within said containing groove and having a radially projecting locking bead at its forward end engaging in said locking groove, the rear end of said lock sleeve being located externally of said female part,
said coupling parts being relatively axially movable toward one another to unlocked positions, wherein the deep end of said containing groove is radially aligned with said locking groove, and said coupling parts being relatively axially movable away from one another to locked positions, wherein the shallow end of said containing groove is radially aligned with said locking groove,
the radial depth of the shallow end of said containing groove being less than the radial cross-sectional dimension of the forward end of said lock sleeve at said locking bead and the radial depth of the deep end of said containing groove being greater than said radial cross-sectional dimension,
said locking bead having a normal diameter to snap into said locking groove when said coupling parts are assembled to said unlocked positions and said locking bead is radially aligned with said locking groove,
the forward wall of said locking groove and the rear surface of said locking bead comprising first coacting camming surfaces which are effective to cam said locking bead radially to a given diameter and out of said locking groove upon axial thrust of said coacting surfaces against one another, and the forward end surface of said one coupling part and the forward surface of said locking bead comprising second coacting camming surfaces which are effective to cam said locking bead radially to said given diameter upon axial thrust of said second coacting camming surfaces against one another, and
force multiplying means operatively coacting between the rear end of said lock sleeve and said other coupling part for relatively axially moving said lock sleeve and said other coupling part to a position wherein said locking bead is located in the deep end of said containing groove, whereby when said coupling parts are in said locked positions, said force multiplying means is effective initially to move said coupling parts toward one another to said unlocked positions and thereafter to retract said lock ring rearwardly relative to said other coupling part to disengage said lock ring from said locking groove, thereby to release said coupling parts for axial separation.

8. A quick disconnect coupling comprising:
a male coupling part having a generally cylindrical forward end,
a female coupling part having a generally circular opening through its forward end receiving the forward end of said male part,
said male part having a circumferential groove in its external surface opening radially toward said female part, and said female part having a circumferential groove in its internal surface opening toward said male part,
the groove in one of said parts comprising a locking groove and the groove in the other part comprising a lock ring containing groove having a relatively shallow forward end and a relatively deep rear end,
a radially yieldable lock ring extending circumferentially of said other part within said containing groove and engaging in said locking groove,
said coupling parts being relatively axially movable toward one another to unlocked positions wherein the deep end of said containing groove is radially aligned with said locking groove, and said coupling parts being relatively axially movable away from one another to locked positions, wherein the shallow end of said containing groove is radially aligned with said locking groove,
the radial depth of said shallow end of said containing groove being less than the radial cross-sectional dimension of said lock ring, whereby said ring is retained in said locking groove when said parts occupy said locked positions, and the radial depth of the deep end of said containing groove being greater than said radial cross-sectional dimension of said ring, whereby said lock ring can yield radially out of said locking groove when said parts occupy said unlocked positions,
means operatively connected to said other coupling part and providing rearwardly presented thrust surface means at diametrically opposite sides of said other part,
means operatively connected to said lock ring and providing forwardly presented thrust surface means located rearwardly of said rearwardly presented thrust shoulder means,
a lever including arms straddling said other coupling part in the vicinity of said thrust surface means,
camming means operatively connected to said lever arms and acting between said forwardly and rearwardly presented thrust surface means at diametrically opposite sides of said other coupling part in such manner that rotation of said lever in one direction is effective to cam said forwardly and rearwardly presented thrust surface means apart to positions wherein said lock ring is located in the deep end of said containing groove, and
spring means acting between said coupling parts for yieldably resisting relative axial movement of said coupling parts toward one another, whereby rotation of said lever in said one direction with said coupling parts in said locked positions is effective to initially relatively axially move said coupling parts from said locked positions to said unlocked positions thereof and thereafter to withdraw said locking ring from said locking groove, thereby to release said coupling parts for axial separation.

9. A quick disconnect coupling comprising:
a male coupling part having a generally cylindrical forward end,
a female coupling part having a generally circular opening through its forward end slidably receiving the forward end of said male coupling part,
said male coupling part having a circumferential containing groove in its external surface opening radially toward said female part, and said female coupling part having a circumferential locking groove in its internal surface opening radially toward said male part,
said containing groove having a relatively radially shallow forward end and a realtively radially deep rear end,
a radially yieldable lock sleeve surrounding said male part within said containing groove and having an external locking bead at its forward end engaging in said locking groove,
said coupling parts being relatively axially movable toward one another to unlocked positions, wherein the deep end of said containing groove is radially aligned with said locking groove, and said coupling parts being relatively axially movable away from one another to locked positions, wherein the shallow end of said containing groove is radially aligned with said locking groove, the radial depth of the shallow end of said containing groove being less than the radial cross-sectional dimension of the forward end of said lock sleeve at said locking bead, whereby said bead is retained in said locking groove when said coupling parts occupy said locked positions, and the radial depth of the deep end of said containing groove being greater than said radial cross-sectional dimension, whereby said locking bead can yield radially out of said locking groove when said coupling parts occupy said unlocked positions, spring means acting between said coupling parts for yieldably resisting relative axial movement of said coupling parts toward one another from said locked positions to said unlocked positions thereof, a generally U-shaped lever having arms straddling said male coupling part, and camming means operatively connected to said lever arms and operatively coacting between said male coupling part and the rear end of said lock sleeve at diametrically opposite sides of said male part in such manner that rotation of said lever in one direction with said coupling parts in said locked positions thereof is effective initially to relatively axially move said coupling parts toward one another to said unlocked positions thereof, against the action of said spring means, and thereafter to withdraw said locking bead from said locking groove, thereby to release said coupling parts for axial separation.

10. A quick disconnect coupling comprising:

a male coupling part having a generally cylindircal forward end, a female coupling part having a generally circular opening through its forward end slidably receiving the forward end of said male coupling part, said male coupling part having a circumferential locking groove in its external surface opening radially toward said female part and said female coupling part having a circumferential lock ring containing groove in its internal surface opening radially toward said male part, said containing groove having a relatively radially shallow forward end and a relatively radially deep rear end, a radially yieldable lock ring contained within said containing groove, said coupling parts being relatively axially movable toward one another to unlocked positions, wherein the deep end of said containing groove is radially aligned with said locking groove, and said coupling parts being relatively axially movable away from one another to locked positions, wherein the shallow end of said containing groove is radially aligned with said locking groove, the radial depth of the shallow end of said containing groove being less than the radial cross-sectional dimension of the forward end of said lock sleeve at said locking bead, whereby said bead is retained in said locking groove when said coupling parts occupy said locked positions, and the radial depth of the deep end of said containing groove being greater than said radial cross-sectional dimension, whereby said locking bead can yield radially out of said locking groove when said coupling parts occupy said unlocked positions, spring means acting between said coupling parts for yieldably resisting relative axial movement of said coupling parts toward one another from said locked positions to said unlocked positions thereof, a sleeve operatively connected to said lock ring for moving said ring rearwardly in said containing groove, a generally U-shaped lever having arms straddling said female coupling part, and camming means operatively connected to said lever arms and acting between said female coupling part and said sleeve at diametrically opposite sides of said female part in such manner that rotation of said lever in one direction with said coupling parts in said locked positions is effective to move said lock ring rearwardly in said containing groove to the deep end of said containing groove and simultaneously relatively axially move said coupling parts toward one another to said unlocked positions thereof against the action of said spring means and thereafter to withdraw said lock ring from said locking groove, thereby to release said coupling parts for axial separation.

11. A quick disconnect coupling comprising:

male and female coupling parts having telescopically interengaging forward ends, a lock sleeve mounted on one of said parts for axial movement relative thereto and disposed in telescopic relation to the other part, said lock sleeve and said other part having confronting circumferential grooves, one of said grooves comprising a locking groove and the other groove comprising a lock ring containing groove having a relatively shallow forward end and a relatively deep rear end, a radially yieldable lock ring disposed within and extending circumferentially of said containing groove and engaging in said locking groove, said lock sleeve and said other coupling part being relatively axially movable toward one another to unlocked positions, wherein the deep end of said containing groove is radially aligned with said locking groove, and said lock sleeve and said other coupling part being relatively axially movable away from one another to locked positions, wherein the shallow end of said containing groove is radially aligned with said locking groove, the radial depth of the shallow end of said containing groove being less than the radial cross-sectional dimension of said locking ring and the radial depth of the deep end of said containing groove being greater than said radial cross-sectional dimension of said ring, there being communicating fluid pasages in said coupling parts extending through said forward ends thereof, normally spring closed valve means in said passage of at least one coupling part, means on said body of the other coupling part engageable with said valve means to open the latter during relative axial movement of said coupling parts toward one another from initial positions to final positions of assembly thereof, and force multiplying means operatively coacting between said one coupling part and said lock sleeve for effecting relative axial movement thereof in such manner that operation of said force multiplying means in one direction effects initial relative axial separation of said coupling parts to close said valve means, subsequent relative axial movement of said lock sleeve and said other coupling part toward one another to said unlocked positions, and final withdrawal of said ring from said locking groove, thereby to permit axial separation of said coupling parts, and operation of said force multiplying means in the opposite direction effects initial relative axial movement of said other coupling part and lock sleeve away from one another to said locked positions and subsequent relative axial movement of said coupling parts toward one another to open said valve means.

12. A quick disconnect coupling according to claim 11 wherein:

said lock sleeve is slidable on said forward end of said female part, and said containing groove comprises an internal groove in said lock sleeve, and said locking groove comprises an external groove in said forward end of said male part.

13. A quick disconnect coupling according to claim 11 wherein:

said lock sleeve is slidable on said forward end of said male part, and said containing groove comprises an external groove in said lock sleeve, and said locking groove comprises an internal groove in said female part.

14. A quick disconnect coupling comprising:

a male coupling part having a generally cylindrical forward end and an external circumferential locking groove in said end, a female coupling part having a generally cylindrical forward end slidably receiving said forward end of said male part, a lock sleeve slidable on said forward end of said female part and surrounding said forward end of said male part, said lock sleeve having an internal lock ring containing groove opening radially toward said locking groove, a radially yieldable lock ring contained in said containing groove and engaging in said locking groove, said lock sleeve and male coupling part being relatively axially movable toward one another to unlocked positions, wherein the deep end of said containing groove is radially aligned with said locking groove, and said lock sleeve and male coupling part being relatively axially movable away from one another to locked positions, wherein the shallow end of said containing groove is radially aligned with said locking groove, the radial depth of the shallow end of said containing groove being less than the radial cross-sectional dimension of said lock ring and the radial depth of the deep end of said containing groove being greater than said radial cross-sectional dimension of said ring, an external lock ring actuating sleeve slidable on said lock sleeve and operatively connected to said lock ring through openings in said lock sleeve for moving said lock ring rearwardly relative to said lock sleeve, spring means acting between said female part and said lock sleeve for resiliently urging said lock sleeve forwardly relative to said female part, there being communicating fluid passages in said coupling parts extending through said forward ends thereof, normally spring closed valve means in said passage of at least one coupling part, means on the other coupling part engageable with said valve means for opening the latter during relative axial movement of said coupling parts toward one another from initial positions to final positions of assembly thereof, a lever, and camming means operatively connected to said lever and operatively coacting between said female part, said actuating sleeve, and said lock sleeve for effecting relative axial movement of said sleeves and female part in such manner that rotation of said lever in one direction is effective to cam said lock sleeve rearwardly on said female part while releasing said actuating sleeve for relative forward movement on said lock sleeve, thereby to cause initial relative axial movement of said lock sleeve and said male part to said locked positions and subsequent relative axial movement of said coupling parts toward one another to open said valve means, and rotation of said lever in the opposite direction is effective to initially release said lock sleeve for forward movement on said female part, thereby to close said valve means, and thereafter to cam said actuating sleeve rearwardly relative to said lock sleeve to a position wherein said lock ring is located in the deep end of said containing groove, thereby to release said parts for axial separation.

15. A quick disconnect coupling according to claim 14 wherein:

said lever is rotatable in said one direction to an overcenter position wherein said lock sleeve is locked in a rear retracted position relative to said female part.

16. A quick disconnect coupling comprising:

a male coupling part having a generally cylindrical forward end, a lock sleeve slidable on said forward end and having an external circumferential lock ring containing groove with a relatively radially shallow forward end and a relatively radially deep rear end, a radially yieldable lock ring surrounding said lock sleeve within said containing groove, a female coupling part having a generally cylindrical forward end slidably engaging in said forward end of said male coupling part, said female part including a forward sleeve coaxially surrounding said forward end of said female part and having an internal circumferential locking groove opening toward said containing groove, said lock ring engaging in said locking groove, said lock sleeve and said female coupling part being relatively axially movable toward one another to unlocked positions, wherein the deep end of said containing groove is radially aligned with said locking groove, and said female coupling part and lock sleeve being relatively axially movable away from one another to locked positions, wherein the shallow end of said containing groove is radially aligned with said locking groove, the radial depth of the shallow end of said containing groove being less than the radial cross-sectional dimension of said locking ring and the radial depth of the deep end of said containing groove being greater than said radial cross-sectional dimension of said ring.

there being communicating fluid passages in said coupling parts extending axially through said forward ends thereof, normally spring closed valve means in the fluid passage of at least one coupling part, means on the other coupling part engageable with said valve means for opening said valve means during relative axial movement of said coupling parts toward one another from initial positions to final positions of assembly thereof, a lever, and camming means operatively connected to said lever and operatively coacting between said lock sleeve and said male part for effecting relative axial movement thereof in such manner that rotation of said lever in one direction initially retracts said lock sleeve rearwardly relative to said male coupling part to a position wherein the shallow end of said containing groove is aligned with said locking groove, thereby to retain said lock ring in said locking groove and thereafter extends said male part forwardly relative to said lock sleeve and toward said female part, thereby to open said valve means and communicate said fluid passages, and rotation of said lever in the opposite direction initially retracts said male coupling part rearwardly relative to said lock sleeve and away from said female part, thereby to close said valve means and thereafter extends said lock sleeve forwardly relative to said male coupling part to a position wherein the deep end of said containing groove is aligned with said locking groove, thereby to release said coupling parts for axial separation.

References Cited by the Examiner

UNITED STATES PATENTS

| | | | |
|---|---|---|---|
| Re. 19,910 | 3/1936 | Parker | 285—308 X |
| 1,916,284 | 7/1933 | Ragan | 285—314 X |
| 2,084,431 | 6/1937 | Catley | 285—321 X |
| 2,441,344 | 5/1948 | Bosworth | 285—321 |
| 2,461,700 | 2/1949 | Scheiwer | 137—614.03 |
| 2,915,325 | 12/1959 | Foster | 251—149.7 X |
| 2,939,728 | 6/1960 | Bitel | 285—315 |
| 3,023,030 | 2/1962 | Torres | 251—149.7 X |

FOREIGN PATENTS

| | | |
|---|---|---|
| 604,290 | 5/1960 | Italy. |

WILLIAM F. O'DEA, *Primary Examiner.*

ISADOR WEIL, *Examiner.*

J. O'NEILL, A. COHAN, *Assistant Examiners.*